Aug. 1, 1961  C. K. STILLWAGON  2,994,342
VALVE
Filed Oct. 21, 1958  2 Sheets-Sheet 1
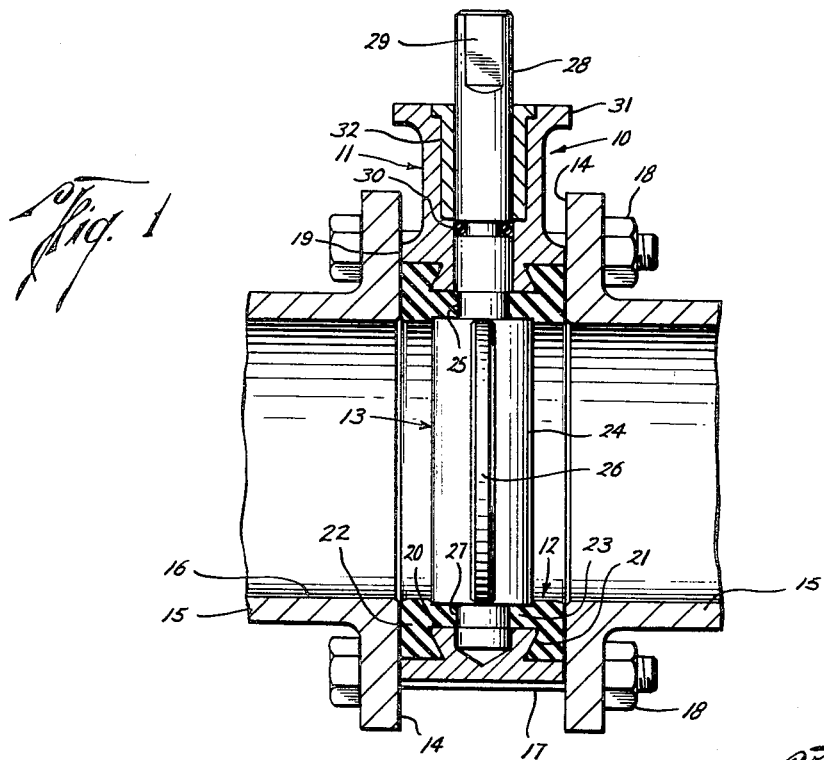
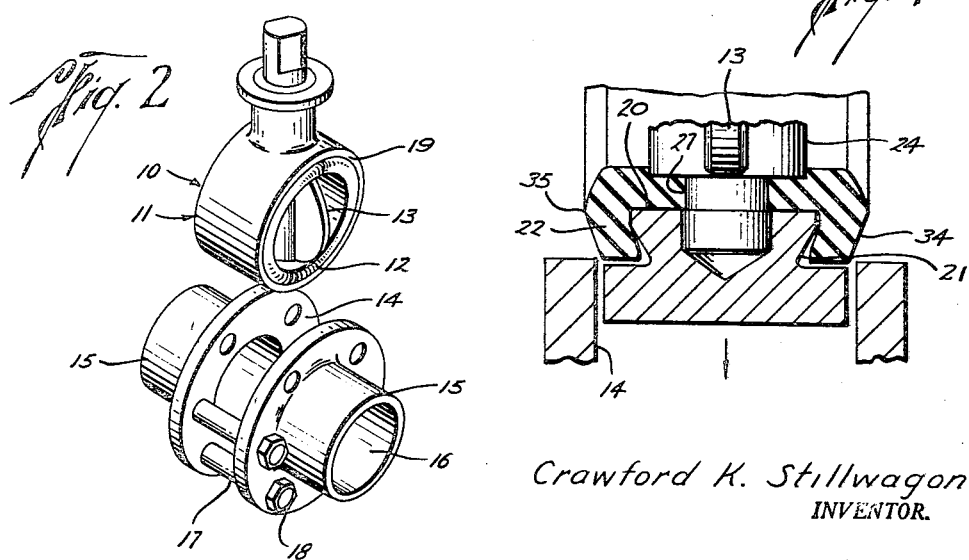
Crawford K. Stillwagon
INVENTOR.
BY Browning, Simms, Hyer
& Eickenroht
ATTORNEYS Aug. 1, 1961   C. K. STILLWAGON   2,994,342
VALVE
Filed Oct. 21, 1958   2 Sheets-Sheet 2
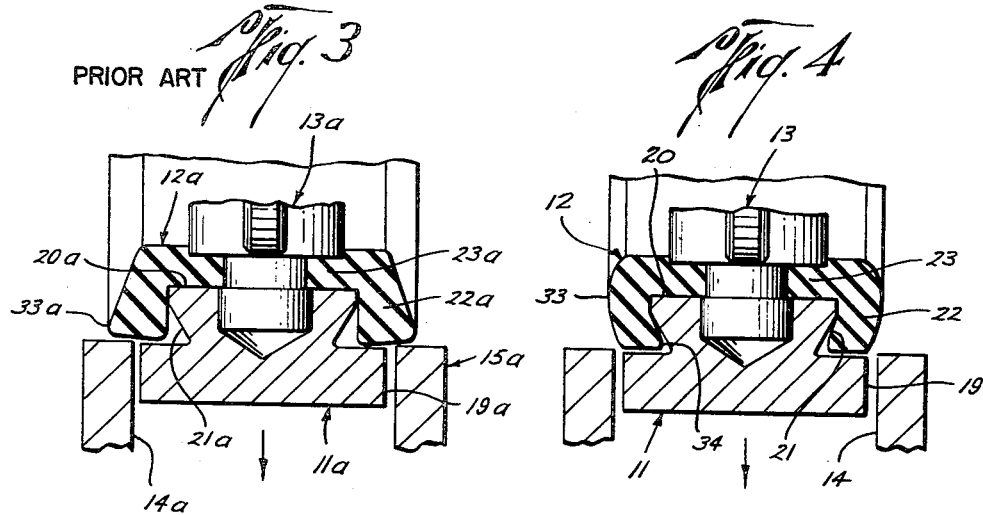
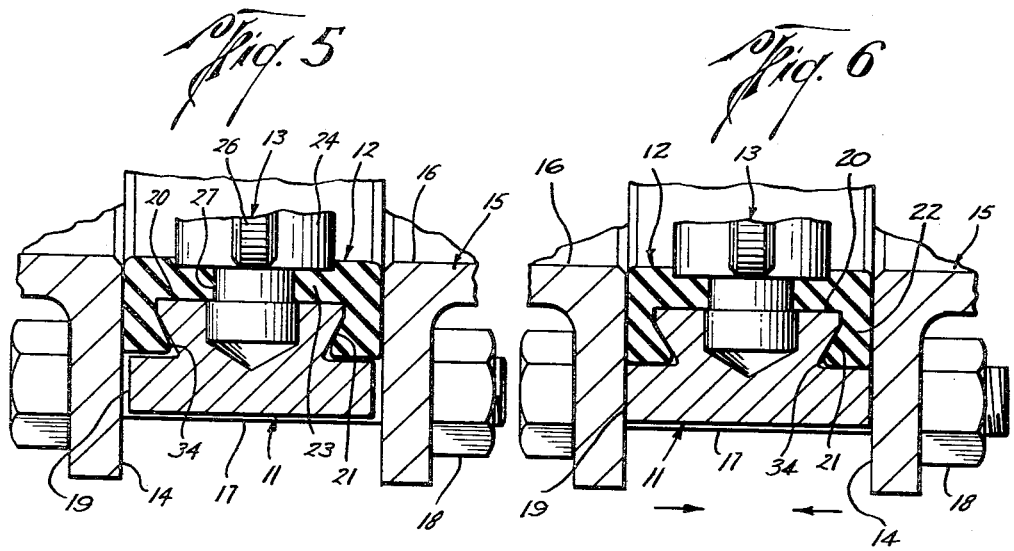
Crawford K. Stillwagon
INVENTOR.
BY Browning, Simms, Ayer & Eickenroht
ATTORNEYS

United States Patent Office 2,994,342
Patented Aug. 1, 1961

2,994,342
VALVE
Crawford K. Stillwagon, 5325 Kirby Drive, Houston, Tex.
Filed Oct. 21, 1958, Ser. No. 768,666
6 Claims. (Cl. 137—454.2)

This invention relates to valves and, more particularly, to improvements in the type of valve shown in my earlier U.S. Patent No. 2,740,423.

In accordance with my earlier invention, there was provided a valve comprising a tubular body disposable between the inner end faces of a conduit, or between the inner end faces of tubular members for connection at their outer ends in a conduit, and a tubular seat of resilient material on the body to form a seal between the body and the end faces as well as between the body and a valve member carried thereby for opening and closing the flowway through the seat. It was a characteristic of this valve that the seat could be readily replaced upon removal of the body from between the end faces and yet was securely held in place upon disposal of the body therebetween, even when used in suction lines.

This was made possible by a novel arrangement in which each opposite side of the tubular body was provided with an annular undercut recess radially inwardly with respect to the axis of the tubular body of an annular face thereon engageable with the adjacent inner end face of the conduit or the tubular members. The seat included a web on the inner periphery of the body for sealing about the valve member in its closed position and flanges on the ends of the web so formed and positioned relative to the body recesses as to at least substantially fill the recesses in forming a seal between the body and end faces. More particularly, the outer sides of the flanges were provided with annular protruding portions about their outer peripheries which were deformed by the end faces, upon disposal of the body therebetween, to cause the substantially flat inner sides thereof to flow into the recesses.

However, it has been found that these annular protruding portions may, during movement of the body into the space, be folded over, or actually interfere with free movement of the body. This is particularly true in those installations in which the end faces of the conduit cannot be spread apart a desired amount.

An object of this invention is to provide a valve of this type in which the flanges on the seat move easily between the end faces without being folded over or otherwise distorted out of sealing engagement between the conduit and body.

This and other objects are accomplished, in accordance with the present invention, by a valve having a body which may be formed as in my earlier invention, and a seat in which the inner side of each flange on the ends of the web thereof has an inturned annular portion partially filling its adjacent recess in the body. The outer side of each flange has surfaces which are contoured to form a gradual annular protrusion on an intermediate portion thereof. These protrusions are adapted to be engaged by the end faces to form a seal between the end faces and body, as in the case of the seat of my earlier invention, and deform the inturned, annular portion into a shape for at least substantially filling said recesses.

As distinguished from the seat of my earlier invention, however, the surfaces on the outer sides of the flanges of the seat provide minimum resistance to insertion of the body into the space between the end faces. Assembly of the body is further facilitated by the fact that, due to the preformed inturned portion on the inner side of each of the flanges, the protrusion on the outer side thereof need not be as large a mass as in my earlier invention in order to form the seal between the body and end faces.

More particularly, the inner and outer peripheries of the outer side of each flange lie substantially in the plane of the adjacent end face of the body, and the surfaces on the outer side extend outwardly and inwardly from said inner and outer peripheries, respectively. As in the case of my earlier invention, the web on the inner periphery of the body seals about the valve member in its closed position.

In the drawings, wherein like reference characters are used throughout to designate like parts:

FIG. 1 is a longitudinal sectional view of a disc type valve constructed in accordance with the present invention, and with the disc in a position closing the flowway through the seat;

FIG. 2 is a perspective view of the body, seat and disc of FIG. 1 removed from the space between the end faces of the conduit or tubular members for connection in a conduit, the disc being shown in its open position;

FIG. 3 is a fragmentary cross-sectional view of the lower end of the body, seat and disc of my earlier invention as they are moved into the space between the end faces;

FIG. 4 is a view, similar to FIG. 3 of the body, seat and disc of FIGS. 1 and 2;

FIG. 5 is a view similar to FIG. 4 of the valve of the present invention, but in which the lower ends of the flanges of the seat thereof have been moved between the end faces;

FIG. 6 is a view similar to FIG. 5, but after the end faces have been moved axially toward one another and into engagement with the annular faces on the ends of the tubular body; and FIG. 7 is a view similar to FIGS. 3 and 4 of a modified form of the valve of the present invention.

Turning now to a detailed description of the above drawings, the valve 10 of the present invention is shown in FIGS. 1 and 2 to comprise a tubular body 11, a tubular seat 12 of resilient material, and a valve member 13 for opening and closing the flowway through the seat. In its operative position, the valve 10 is disposed between the inner end faces 14 of tubular flange members 15 which may be connected at their outer ends in a conduit (not shown) or which may form the inner ends of the conduit itself. As can be seen from FIG. 1, the flowway through the seat 12 forms a continuation of the flowway 16 through the flange members 15.

The radially extending flanges of the members 15 are connected together by means of bolts 17 within which the valve is supported, as described in my prior patent. As indicated in FIG. 2, certain of the bolts may be removed to permit the valve to be moved into and out of assembled position. Nuts 18 on the ends of the bolts enable the end faces 14 to be moved axially toward and away from one another so as to facilitate this assembly in a manner to be described.

As previously noted, the body 11 may correspond substantially to the body of the valve of my earlier invention. Thus, as shown in FIG. 1, its opposite sides are provided with flat annular faces 19 which engage the flat end faces 14 of the flange members 15 and lie in planes substantially transverse to the flowway to permit the valve to be assembled in the manner described. A dove-tailed rim 20 on an intermediate portion of the inner periphery of the body forms annular undercut recesses 21 on the sides of the body radially inwardly of the faces 19 thereon with respect to the axis of the tubular body 11 and opposite the end faces 14 of the flange members.

As in the seat of my earlier invention, the seat 12 comprises an integral member having a web 23 about the rim 20 and annular flanges 22 on each end of the web which extend radially outwardly between the end faces 14 of the flange members and the recesses 21. With the end faces tightened up against the faces 19 on the body, the flanges seal between the body and flange members and at least substantially fill the recesses 21. The seat is not bonded or otherwise secured to the body so that it is easily removed therefrom for replacement.

The valve member 13 comprises a disc having a central tubular portion 24 mounted upon a stem 25 for rotation between a position opening the flowway, as shown in FIG. 2, and a position closing same, as shown in FIG. 1. The outer edge 26 of the disc has a somewhat greater diameter than the flowway through the web 23 of the seat so as to seal with respect thereto in its closed position.

As shown in FIG. 1, the stem 25 includes a lower end 27 journaled in the lower portion of the tubular body and an upper end 28 journaled in the upper portion of the body and having a part 29 extending exteriorly thereof for manipulation by a suitable tool in rotating the disc between its opened and closed positions. The stem end portions are removably received through holes in the web to permit the separation of stem and disc in replacing the seat. The compression of the web upon closing of the disc will increase the tightness of the holes about these portions. An O-ring 30 surrounds the stem portion 28 to form a seal with the upper portion of the body, and a bushing 32 is received within a counterbore of a neck 31 of the body to surround the stem end portion 28 above the seal ring 30.

The difficulty encountered in assembling the valve of my earlier invention is best illustrated in FIG. 3, wherein the various elements of the lower end of the body and seat of such valve are designated by reference characters corresponding to those of the valve of my present invention with the addition of the letter "a." As can be seen from this illustration, a protruding portion 33a on the outer periphery of the outer side of each of flanges 22a engages the inside edge of the end face 14a of each of the flange members 15a as the valve is first inserted between the end faces. Obviously, the abruptness of this protruding portion will interfere with the free movement of the flanges between the end faces 14a and, as previously mentioned, may cause such flanges to fold over. This is true even when it is possible to separate their faces, as illustrated in FIG. 3.

As shown in FIG. 4, in the valve of my present invention, the inner and outer peripheries of the outer side of each flange 22 lie substantially in the plane of the adjacent end face 19 of the body so as to prevent interference with assembly and disassembly of the valve even when it is impossible to separate the end faces 14 of the flange members a desired amount. The outer sides of the flanges have surfaces which extend axially outwardly from both the outer and inner periphery of the flanges to form annular gradually protruding portions 33 intermediate such inner and outer peripheries. Each of the flanges is also provided with an annular inturned portion 34 on the inner side thereof which partially fills the recess 21. As will be apparent from a comparison of FIGS. 3 and 4, a portion of the mass of resilient material of flange necessary to seal between the body and end faces and at least substantially fill the recesses 21 has been transferred from the protruding portions on the outer sides of the flanges of my earlier seat to the inturned portions 34 of the seat of my present invention.

More particularly, as can be seen from FIG. 4, the inner side surface of the inturned portion of each flange forms a slightly smaller angle with respect to a plane transverse to the axis of the flowway than the adjacent side of the recess 21 to form an outwardly divergent angular space therebetween. For example, these angles may be about 22° and 30°, respectively.

Thus, the outer surface on the outer side of each flange 22 will permit the body to slide easily into the space between the end faces 14 of the flange members 15, particularly when such end faces are separated by loosening of the nuts 18. As the body is so moved, the protruding portion 33 on each side of the web thereof will initially engage the adjacent end face 14 to be deformed a certain amount. This deformation of the protruding portion 33 will, in turn, move the inturned portion 34 of the flange inwardly to narrow the angular space between it and the recess and fill a greater volume of the recess 21, as shown in FIG. 5.

Then, the nuts 18 may be tightened on the bolts 17 so as to move the end faces 14 into abutment with the end faces 19 of the body and further deform the flanges 22 so that the inturned portions 34 thereof will flow further into the recesses 21 and at least substantially fill same, as shown in FIG. 6. In this respect, as a practical matter, there will probably be small voids in the inner corners of the recesses as well as adjacent the outer peripheries of the flanges between the body and flange members.

When it is desired to remove the body from between the end faces of the flange members, the nuts 18 may be loosened so as to move the end faces 14 radially outwardly, and several of the studs 17 may be removed, as shown in FIG. 2, to permit the valve to be removed to a position where the seat 12 may be replaced, if desired. During such removal of the valve, the gradually contoured inner surface on the outer side of each of the flanges 22 will slide freely over the inner edges of the end faces adjacent the upper end of the flange members 15 to prevent damage to the seat as the valve is removed.

These surfaces on the outer side of each of the flanges 22 may be curved, as shown in FIG. 4, or the outer surface 34 thereof may be conical, as shown in FIG. 7. In the case of this alternative embodiment, an annular protruding portion 35 is formed intermediate the inner and outer peripheries of each of the flanges 22, as in the case of the protruding portion 33 of the first-described embodiment.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising tubular members for connection at their outer ends in a conduit with their inner ends spaced apart, a tubular body movable into the space and having a face on each side abuttable with the inner end of the adjacent tubular member, an annular undercut recess on each side of the body radially inwardly of the faces thereon for disposal opposite the end face of said adjacent tubular member, a seat of resilient material on the body forming a flowway through the body and including flanges opposite each recess having inner and outer sides, and a valve member carried by the body for movement between positions opening and sealably closing the flowway, the inner side of each flange having an inturned portion partially filling said recess and the outer side thereof having surfaces which extend axially outwardly from its outer and inner peripheries, respectively, to form a gradual annular protrusion on an intermediate portion of said outer side, the combined volumes of the inturned portion and protrusion on each flange at least substantially equalling the volume of the recess to which said flange is opposite, and said protrusions being engaged by the ends of the tubular members, upon movement of the body into said space, to at least substantially flatten out said protrusions and force said inturned portions into positions in which they at least substantially fill said recesses.

2. In a valve, comprising a tubular body having an annular undercut recess on each side thereof and annular planar end faces surrounding the recesses radially and axially outwardly thereof, and a seat of resilient material including a web about the inner periphery of the body and annular flanges extending radially outwardly from each end of the web opposite the recesses, the inner and outer peripheries of the outer side of each flange lying substantially in the plane of the adjacent end face thereof, and the inner side of each flange having an inturned portion partially filling said recess and the outer side thereof having surfaces which extend axially outwardly from the inner and outer peripheries thereof, respectively, to form a gradual annular protrusion intermediate said inner and outer peripheries, the combined volumes of the intured portion and protrusion on each flange at least substantially equalling the volume of the recess to which said flange is opposite.

3. A valve of the character defined in claim 2, including a valve member carried by the body for movement between an open position and a closed position in which the web of said seat forms a seal thereabout.

4. A valve seat for use with a tubular body having undercut recesses of predetermined volume on opposite sides thereof which are adapted to be filled by annular inturned portions on the inner side of annular flanges on the valve seat disposed opposite thereto, comprising a tubular body of resilient material having an annular web and annular flanges of a predetermined volume extending radially outwardly with respect to the axis of the tubular body from each end of the web, the inner side of each flange having an annular inturned portion, and the outer side thereof having surfaces which extend axially outwardly from its outer and inner periphery, respectively, to form a gradual protrusion thereon intermediate said inner and outer peripheries, said annular web having an opening therethrough to receive at least part of a valve member, and the inner side of the web having a seating surface thereon engageable about the valve member in its closed position.

5. A seat of the character defined in claim 4, wherein said surfaces are curved.

6. A seat of the character defined in claim 4, wherein said surfaces are substantially conical.

References Cited in the file of this patent

UNITED STATES PATENTS

| | | |
|---|---|---|
| 2,401,377 | Smith | June 4, 1946 |
| 2,629,376 | Gallice | Feb. 24, 1953 |
| 2,673,062 | Cornelius | Mar. 23, 1954 |
| 2,740,423 | Stillwagon | Apr. 3, 1956 |
| 2,858,098 | Sanctuary | Oct. 28, 1958 |

FOREIGN PATENTS

| | | |
|---|---|---|
| 69,188 | Great Britain | Oct. 7, 1953 |